(12) United States Patent
Kumagai et al.

(10) Patent No.: US 8,193,793 B2
(45) Date of Patent: Jun. 5, 2012

(54) DC-DC CONVERTER

(75) Inventors: Keizo Kumagai, Atsugi (JP); Takashi Hiroshima, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 426 days.

(21) Appl. No.: 12/486,210

(22) Filed: Jun. 17, 2009

(65) Prior Publication Data

US 2009/0315523 A1 Dec. 24, 2009

(30) Foreign Application Priority Data

Jun. 20, 2008 (JP) .................................. 2008-161352

(51) Int. Cl.
G05F 1/40 (2006.01)
(52) U.S. Cl. ....................................................... 323/282
(58) Field of Classification Search .................. 323/268, 323/271, 282–285, 351
See application file for complete search history.

(56) References Cited

U.S. PATENT DOCUMENTS

| | | | | |
|---|---|---|---|---|
| 6,154,015 | A * | 11/2000 | Ichiba | 323/225 |
| 7,116,089 | B1 | 10/2006 | Nguyen et al. | |
| 7,183,856 | B2 * | 2/2007 | Miki et al. | 330/297 |
| 7,382,114 | B2 * | 6/2008 | Groom | 323/271 |
| 7,456,623 | B2 * | 11/2008 | Hasegawa et al. | 323/285 |
| 7,579,820 | B2 | 8/2009 | Hane | |
| 7,635,969 | B2 * | 12/2009 | Hoshino et al. | 323/277 |
| 2007/0046273 | A1 | 3/2007 | Riehl | |
| 2007/0176588 | A1 | 8/2007 | Nishida | |

FOREIGN PATENT DOCUMENTS

| | | |
|---|---|---|
| JP | 11-89222 A | 3/1999 |
| JP | 2003-219637 A | 7/2003 |
| JP | 2006-149067 A | 6/2006 |
| JP | 2007-202273 A | 8/2007 |
| JP | 2007-209180 A | 8/2007 |
| JP | 2008-092712 A | 4/2008 |

OTHER PUBLICATIONS

Japanese Office Action dated May 25, 2010 and English translation thereof, issued in counterpart Japanese Application No. 2008-161352.

Japanese Office Action dated Jan. 19, 2010 and English translation thereof issued in a counterpart Japanese Application No. 2008-161352.

(Continued)

*Primary Examiner* — Adolf Berhane
(74) *Attorney, Agent, or Firm* — Holtz, Holtz, Goodman & Chick, PC

(57) ABSTRACT

Provided is a DC-DC converter comprising: a drive switching element so that a current flows to an inductor, the drive switching element being driven by a PWM control pulse or a PFM control pulse, wherein a direct-current input voltage supplied from a direct-current power source is converted so as to output the converted direct-current voltage having a different potential, and wherein a PWM control is performed when a load is larger than a predetermined value and a PFM control is performed when the load is smaller than the predetermined value, the DC-DC converter further comprising: a pulse width regulation section to regulate the PWM control pulse so as not to have a pulse width smaller than a predetermined pulse width, at least when the PFM control is switched to the PWM control.

4 Claims, 4 Drawing Sheets

OTHER PUBLICATIONS

Extended European Search Report dated Sep. 2, 2009 (8 pages), issued in counterpart European Application Serial No. 09163103.6.
Chen, Chi-Lin, et al., "Fast mode-switching technique in hrbrid—mode operation", Circuits and Systems, 2008, pp. 9-12, Aug. 10, 2008.

Chen, Chi-Lin, et al., "A new PWM/PFM control technique for improving efficiency over wide load range", Electronics, Circuits and Systems, 2008, pp. 962-965, Aug. 31, 2008.

* cited by examiner

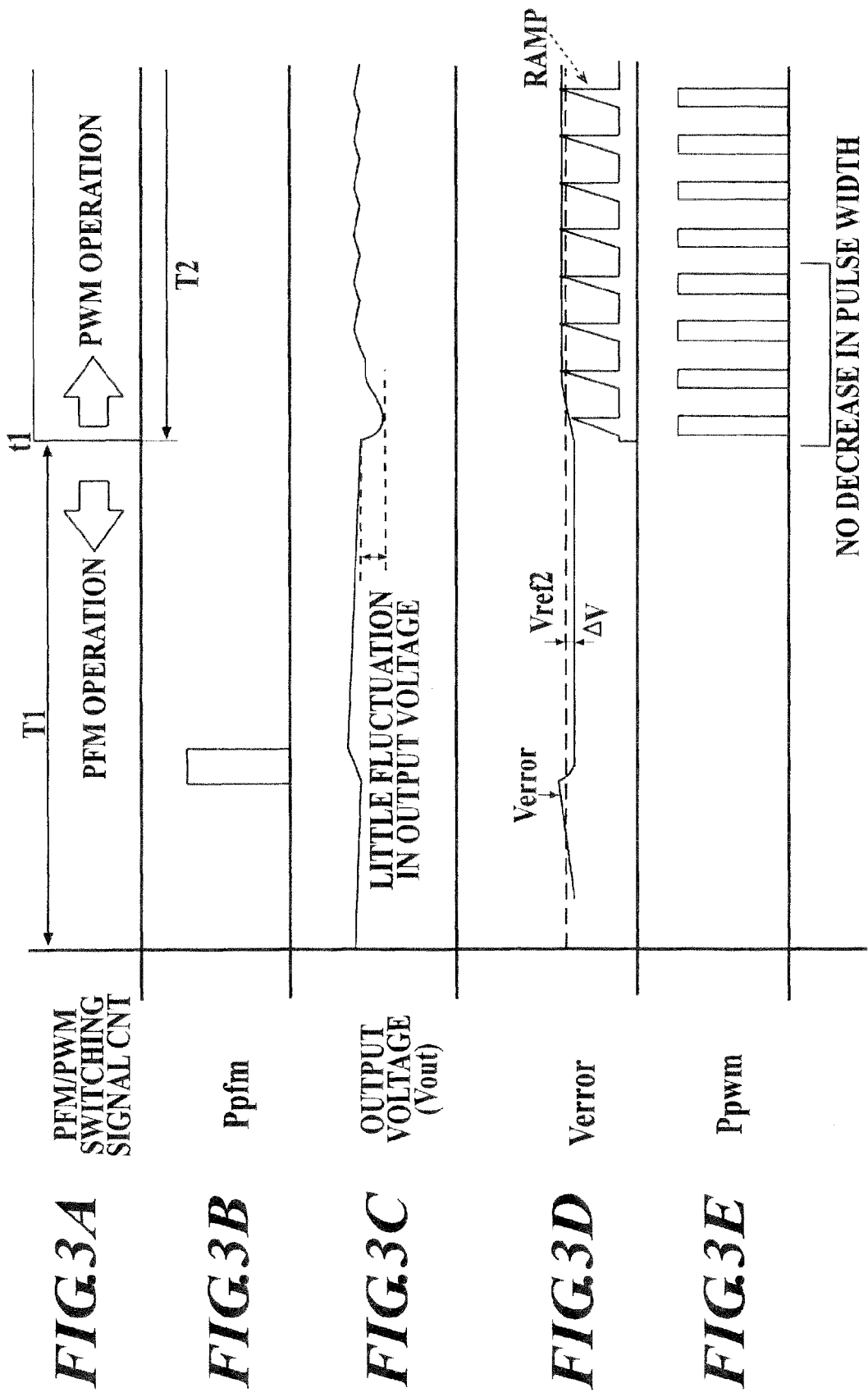

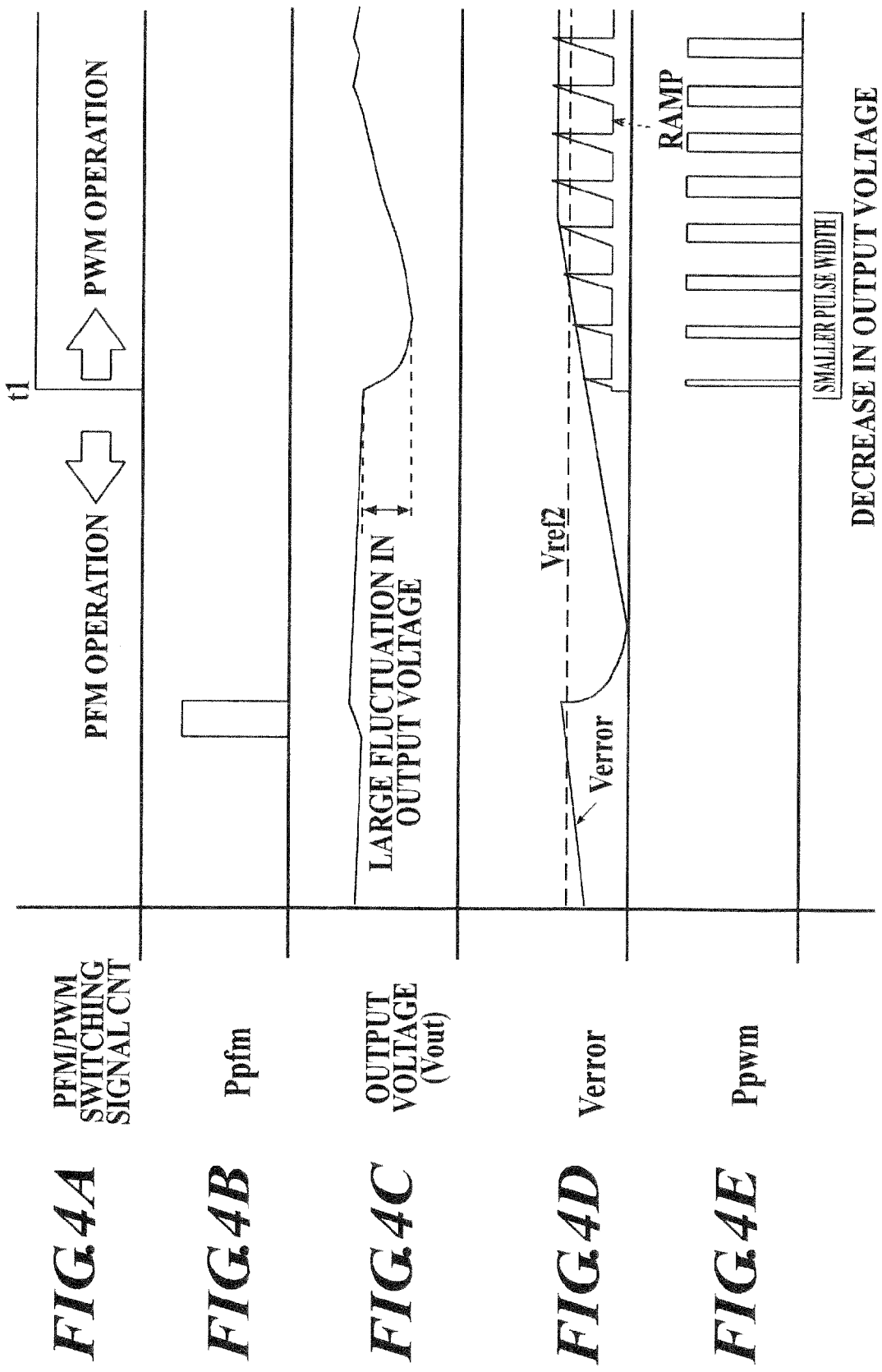

DC-DC CONVERTER

BACKGROUND OF THE INVENTION

1. Field of the Invention

The present invention relates to a DC-DC converter of a switching regulator system to convert a direct-current voltage, and for example, to a technique which is effective for being applied to a DC-DC converter comprising a pulse-width modulation (PWM) control mode and a pulse-frequency modulation (PFM) control mode, to perform a PFM drive when a current flowing in a load becomes small in amount

2. Description of Related Art

There is a DC-DC converter of a switching regulator system as a circuit to convert an input direct-current voltage so as to output a direct-current voltage having a different potential. As such a DC-DC converter, there is a DC-DC converter comprising a drive switching element to apply a direct-current voltage supplied from a direct-current power source such as a battery, and the like, to an inductor (a coil) and to flow the input current so that an energy is accumulated in the coil; a rectification element to rectify the current in the coil during an energy discharging period at which the drive switching element is set to be off; and a control circuit to control the on and off of the drive switching element.

In such a DC-DC converter of the switching regulator system, the following control is generally performed. That is, the output voltage is detected by an error amplifier so that the detected output voltage is performed with feedback to a pulse-width modulation (PWM) comparator or a pulse-frequency modulation (PFM) comparator. Further, the time while the switching element is set to on is prolonged when the output voltage decreases, and the time while the switching element is set to on is shortened when the output voltage increases.

Further, in the PWM control, a pulse width is fluctuated according to the load, in a state where the period (the frequency) of the drive pulse is maintained to be even. Even when the load is very light, the pulse having the minimum pulse width which is determined by the characteristics of the circuit is to be output. Further, a case may occur in which when the fluctuation width of the load is very large, the output current is to be too much even when driven by the pulse having the minimum pulse width. Accordingly, there also is a DC-DC converter comprising the PWM comparator and the PFM comparator. In such a DC-DC converter, the PWM control is performed under a normal condition, and in a case where the current flowing in the load decreases, that is to say, when the load is light, the converter is driven by the pulse width of an even fixed pulse, and the frequency is fluctuated according to the load, thereby the converter is shifted to the PFM control. Such an invention pertaining to the DC-DC converter is disclosed, for example, in Japanese Patent Application Laid-open Publication Nos. 2006-149067 and 2003-219637.

In a portable electronic device such as a mobile phone, when the DC-DC converter in which the above described PWM control and the PFM control are performed by being switched to and from each other, is applied as a power source equipment, the device is operated in the PFM control at a standby state in which a main body section and a display section are folded up, because the electric power consumption is very small in amount. When the display section is opened from this state, the electric power consumption is increased by some degree due to the lighting of the display section, and the like. However, the electric power consumption is not increased on a grand scale suddenly. Still, the electric power consumption may likely be increased when the subsequent operations are to be performed. Thus, it is preferable for the power source equipment of the device to previously be shifted to the PWM control mode from the PFM control mode, so as to be capable of accepting such operations quickly.

In the PFM control, the pulse frequency thereof is longer than that of the PWM control, however, the pulse width thereof is broader than that of the PWM control. Thus, the output of the error amplifier to detect the output voltage is to fluctuate greatly. Therefore, when the PFM control is switched to the PWM control in the above described manners it is discovered that there is a possibility that the output voltage may be greatly decreased, depending on the timing of the switching.

To put it concretely, as shown in FIGS. 4A-4E, for example, when the switching from the PFM to the PWM is performed in a relatively quick timing (time t1) from the output of the drive pulse in the PFM control, the output Verror of the error amplifier is not sufficiently raised. Thus, in a case of the control to start the PWM control pulse, at the timing where the waveform signal (a triangular wave) RAMP to be input to the PWM comparator reaches the output level of the error amplifier, or intersects the output thereof, the PWM control pulse may significantly be narrowed than the PFM control pulse. Therefore, the smoothing condenser at the output side cannot be supplied with a sufficient charge, the output voltage Vout is greatly decreased as shown in FIG. 4C, and the fluctuation of the output voltage Vout is to be large

SUMMARY OF THE INVENTION

The present invention was made in view of the above described problems, and it is therefore, a main object of the present invention is to provide a control technique to avoid the output voltage from being greatly decreased at the occasion of the switching from the PFM control to the PWM control, in the DC-DC converter comprising the PWM control mode and the PFM control mode so as to generate the drive pulse by the PFM control mode when the load is light.

According to an aspect of the present invention, there is provided a DC-DC converter comprising:

a drive switching element so that a current flows to an inductor, the drive switching element being driven by a PWM control pulse or a PFM control pulse, wherein a direct-current input voltage supplied from a direct-current power source is converted so as to output the converted direct-current voltage having a different potential, and wherein a PWM control is performed when a load is larger than a predetermined value and a PFM control is performed when the load is smaller than the predetermined value, the DC-DC converter further comprising:

a pulse width regulation section to regulate the PWM control pulse so as not to have a pulse width smaller than a predetermined pulse width, at least when the PFM control is switched to the PWM control.

According to another aspect of the present invention, there is provided a DC-DC converter comprising:

an inductor to convert a voltage;

a drive switching element to apply a direct-current input voltage supplied from a direct-current power source to the inductor, so that a current flows and so as to accumulate energy in the inductor;

a rectification element to rectify the current in the inductor during an energy discharging period in which the drive switching element is turned off; and a switching control circuit comprising:

an error amplifier to output a voltage according to an output voltage, and a PWM comparator and a PFM comparator to compare the output of the error amplifier with a predetermined reference voltage, so as to control a time during which the drive switching element is turned on based on an output of the PWM comparator and of the PFM comparator, wherein a PWM control is performed based on the output of the PWM comparator when a load is larger than a predetermined value and a PFM control is performed based on the output of the PFM comparator when the load is smaller than the predetermined value, and wherein the switching control circuit comprises a clamp circuit to clamp the output of the error amplifier at least when the PFM control is switched to the PWM control.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIGS. 3A-3E are timing charts showing signals and changes in potential at each section in the DC-DC converter according to the embodiment; and FIGS. 4A-4E are timing charts showing signals and changes in potential at each section in the DC-DC converter not being provided with the clamp circuit, which is discussed before the embodiment of the present invention.

DETAILED DESCRIPTION OF THE PREFERRED EMBODIMENT

In the following, an embodiment of the present invention will be explained with reference to the drawings.

Figure 1:
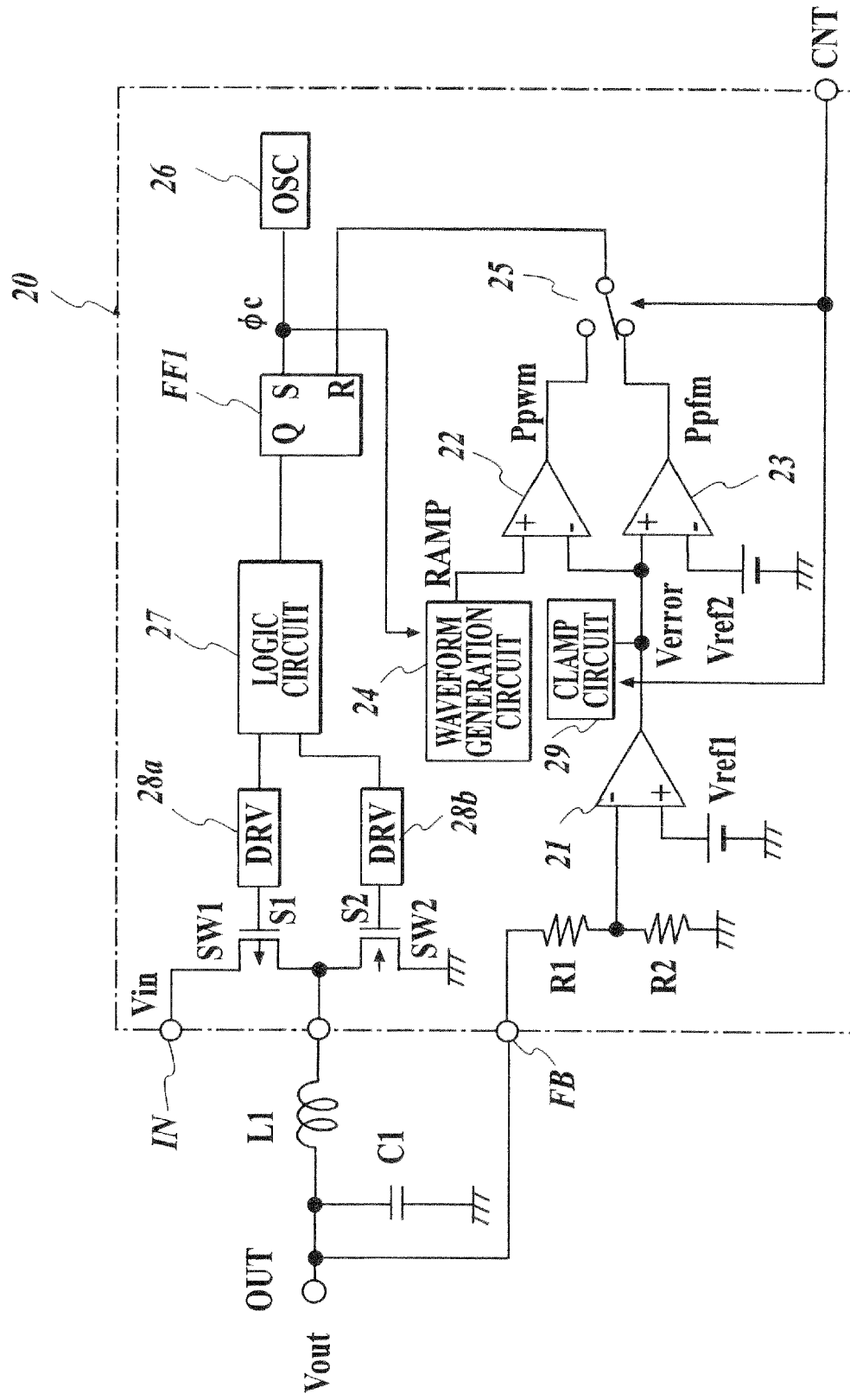
FIG. 1 is a circuit configuration diagram showing an embodiment of the DC-DC converter to which the present invention is applied.

FIG. 1 shows an embodiment of the DC-DC converter of the switching regulator system to which the present invention is applied.

The DC-DC converter according to the embodiment comprises: a coil L1 as an inductor; a drive transistor SW1 as a switching element comprising a P channel metal oxide semiconductor field effect transistor (MOSFET) to flow a current to the coil L1, which is connected in between a voltage input terminal IN to be applied with the direct-current input voltage Vin, and one terminal of the coil L1; a rectification transistor SW2 comprising an N channel MOSFET; a switching control circuit 20 to control the on and off of the switching transistors SW1, SW2; and a smoothing condenser C1 which is connected in between the other terminal of the coil L1 and a ground point.

Although not specifically limited, the elements which configure the DC-DC converter except the coil L1 and the smoothing condenser C1, are formed on the semiconductor chip; the control circuit 20 and the switching transistors SW1, SW2 are configured as semiconductor integrated circuits (IC); and the coil L1 and the condenser C1 are to be connected to external terminals provided in the IC as external elements.

In the DC-DC converter according to the embodiment, the drive pulse to complementarily turn the transistors SW1 and SW2 on and off is generated by the switching control circuit 20. In a static state, when the drive transistor SW1 is turned on, the coil L1 is applied with the direct-current input voltage Vin, and the current toward the output terminal is flowed, so that the smoothing condenser C1 is charged. When the drive transistor SW1 is turned off, the rectification transistor SW2 is turned on instead, and the current is flowed to the coil L1 through the transistor SW2 which is turned on. Then, the pulse width of the drive pulse to be input to the control terminal (a gate terminal) of SW1 is controlled according to the output voltage and the current of the drive transistor SW1, thereby the direct-current output voltage Vout in which the voltage is decreased from the direct-current input voltage Vin is generated.

The switching control circuit 20 comprises: bleeder resistances R1, R2 to divide the voltage of the output voltage Vout based on the resistance ratio, which are connected in series in between a voltage feedback terminal FB and the ground point; an error amplifier 21 to output the voltage according to the potential difference obtained by comparing the voltage divided by the bleeder resistances R1, R2 and a reference voltage Vref1; a PWM comparator 22 and a PFM comparator 23 to input the output of the error amplifier 21 to an inverting input terminal; and a waveform generation circuit 24 to generate a waveform signal RAMP having a saw-like form.

Further, the switching control circuit 20 comprises: a changeover switch 25 to select the output from either the PWM comparator 22 or the PFM comparator 23; a clock generation circuit 26 comprising an oscillation circuit to generate and output a clock pulse øc of a frequency of for example, 1 MHz, an RS flip-flop FF1 which is operated to be set by the clock pulse øc; a logic circuit 27 to generate a signal to control the on and off of the switching transistors SW1, SW2 according to the output of the flip-flop FF1; and drivers 28a, 28b to generate a signal to drive the on and off of the switching transistors SW1, SW2 based on the output of the logic circuit 27.

In the present embodiment, the output of the PWM comparator 22 or the PFM comparator 23 selected by the above mentioned changeover switch 25 is configured to be input to the RS flip-flop FF1.

The waveform signal RAMP having the saw-like form generated in the waveform generation circuit 24 is input to a non-inverting input terminal of the PWM comparator 22. When the waveform signal RAMP reaches the output level of the error amplifier 21, the output Ppwm of the PWM comparator 22 is changed to a high level. Further, the reference voltage Vref2 is applied to the non-inverting input terminal of the PFM comparator 23, and when the output Verror of the error amplifier 21 becomes higher than the reference voltage Vref2, the output of the PFM comparator 23 is changed to a high level. An output section of the PFM comparator 23 may be provided with a one-shot pulse generation circuit to output PFM pulse Ppfm having a predetermined pulse width when the output Verror of the error amplifier 21 becomes higher than the reference voltage Vref2.

The changeover switch 25 is switched by a switching control signal CNT which is input from outside, and in the PWM control mode, the output Ppwm of the PWM comparator 22 is supplied to the RS flip-flop FF1 through the changeover switch 25 so as to reset the RS flip-flop FF1. Further, in the PFM control mode, the output Ppfm of the PFM comparator 23 is supplied to the RS flip-flop FF1 through the changeover switch 25. On this occasion, the Ppfm is transmitted to the logic circuit 27 as it is through the flip-flop FF1. Alternatively, a gate to transmit Ppwm to the flip-flop FF1 and a gate to transmit Ppfm to the logic circuit 27 may be provided instead of the changeover switch 25, so that these transmission gates are controlled complementarily, that is to say, the gates may be controlled so that when one is in transmission, one is to be in interruption.

The above mentioned logic circuit 27 generates drive signals S1, S2 to complementarily turn on the switching transistors SW1, SW2. Further, in order to prevent the flowing of the through-current during which the SW1 and SW2 are in an on state at the same time, the logic circuit 27 comprises a function to generate S1, S2 so that the low-level period of the drive signal S1 of the SW1 and the high-level period of the drive signal S2 of the SW2 are not overlapped.

The switching control circuit 20 according to the present embodiment is provided with a clamp circuit 29 so that the voltage is clamped to a voltage which is lower than the threshold value (Vref2) of the PFM comparator 23 by ΔV, thereby preventing the output of the error amplifier 21 from decreasing too much. The switching control signal CNT is supplied to the clamp circuit 29 so that the output of the error amplifier 21 is clamped for the period in the PFM control mode. Thus, a pulse width regulation section is configured to regulate the generated PWM pulse so as not to be smaller than a predetermined pulse width, by the error amplifier 21, the PWM comparator 22, and the clamp circuit 29.

Figure 2A:
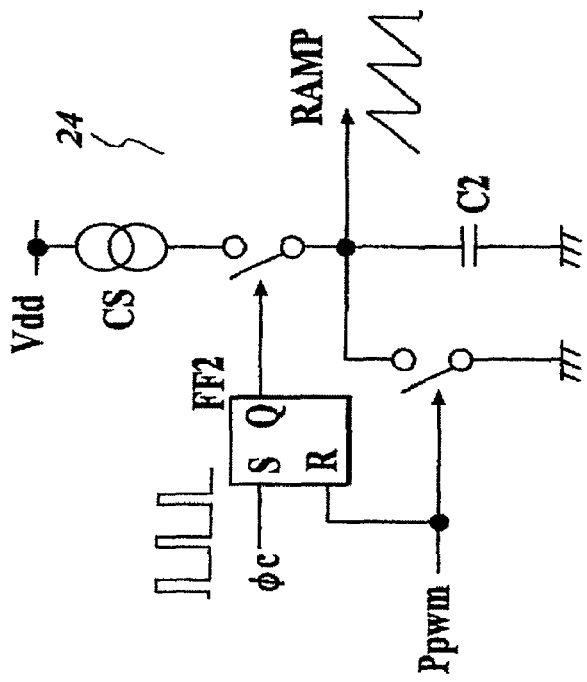
FIG. 2A is a circuit configuration diagram showing a concrete example of a clamp circuit.

To put it concretely, as shown in FIG. 2A, the clamp circuit 29 comprises: a P channel MOS transistor Q1 which is connected in between the output terminal of the error amplifier 21 and the terminal to which the power source voltage Vdd is applied; and a differential amplifier circuit AMP to input the output of the error amplifier 21 and the reference voltage Vref3.

Thereby, when the output of the error amplifier 21 becomes lower than the reference voltage Vref3, the output of the differential amplifier circuit AMP is changed to a low level so that the P channel MOS transistor Q1 is turned on. The input of the differential amplifier circuit AMP is performed with feedback so that the output of the error amplifier 21 matches the Vref3, and the output of the error amplifier 21 is clamped to Vref3. The control signal CNT is supplied as the signal to turn on and off the constant current source in the comparator CMP. The reference voltage Vref3 is set to have a lower potential than Vref2 which is the threshold value of the PFM comparator 23. The Vref3 may be generated inside or may be supplied from outside.

Figure 2B:
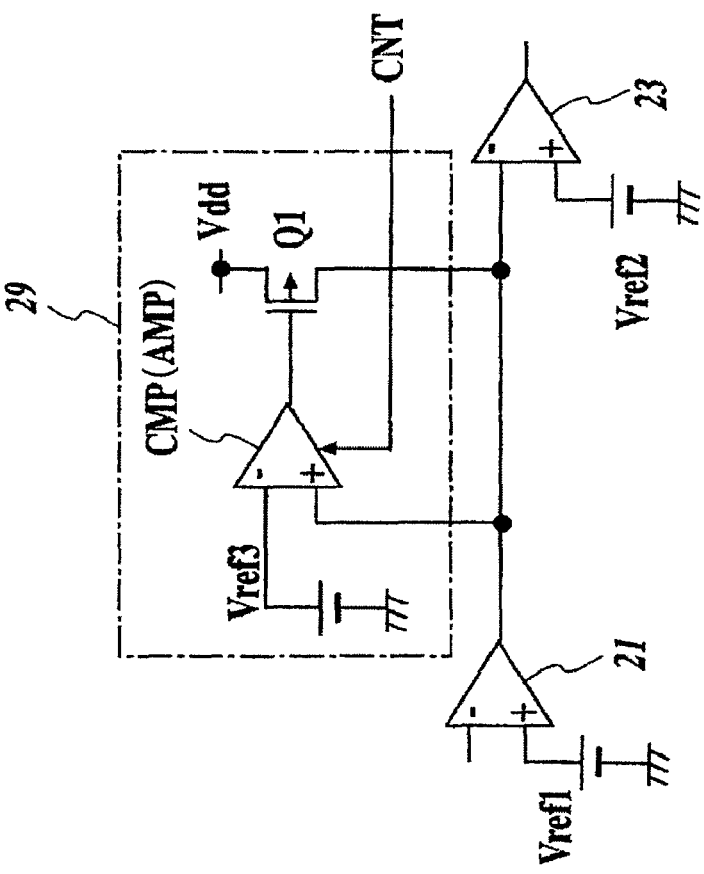
FIG. 2B is a circuit configuration diagram showing a concrete example of a wafeform generation circuit.

As shown in FIG. 2B, for example, the waveform generation circuit 24 comprises: a constant current source CS; a condenser C2 which is charged by the current from the constant current source CS; a switch for charging and discharging; a flip-flop FF2 to latch the clock øc so as to generate a control signal of the charging switch, and the like. The FF2 is set by the clock øc from the clock generation circuit 26, and the condenser C2 starts the charging based on the changes of the output Q. Subsequently, the waveform signal RAMP is started and gradually increased When the level of the waveform signal RAMP reaches the output of the error amplifier 21, the output Ppwm of the PWM comparator 22 changes, so that the condenser C2 is discharged and the waveform signal RAMP is to be decreased at once. Thereby, the waveform signal RAMP is to be a waveform signal having the saw-like form in which the height thereof changes according to the output of the error amplifier 21.

FIGS. 3A-3E show the operation timing of the DC-DC converter according to the present embodiment. In FIGS. 3A-3E, t1 represents the switching timing from the PFM control to the PWM control, and T1 and T2 indicate the driving period by the PFM control mode, and the driving period by the PWM control mode, respectively. FIG. 3A shows the switching control signal CNT to switch the PFM control and the PWM control; FIG. 3B shows the output Ppfm of the PFM comparator 23; FIG. 3C shows the output voltage Vout of the DC-DC converter; FIG. 3D shows the output Verror of the error amplifier 21 and the waveform signal RAMP output from the waveform generation circuit 24; and FIG. 3E shows the changes of the output Ppwm of the PWM comparator 22.

In the DC-DC converter according to the present embodiment, as shown in FIG. 3D, the output Verror of the error amplifier 21 is clamped to Vref3 which is lower than Vref2 by ΔV during the PFM control mode (T1), thus the peak of the waveform signal RAMP in which the peak point changes according to the output Verror of the error amplifier 21, is higher than that in FIG. 4D, which is clear from the comparison with FIGS. 4A-4E showing the operation timing of the DC-DC converter not being provided with the clamp circuit 29. Thereby, as shown in FIG. 3E, the pulse width of the output Ppwm of the PWM comparator 22 is to be broader than that in FIG. 4E, and the charge to be supplied to the smoothing condenser C1 in the output side is to be greater. As shown in FIG. 3C, the decrease in output voltage Vout is to be smaller than that in FIG. 4C, and the fluctuation of the output voltage Vout is to be smaller.

The present invention made by the inventors has been concretely described based on the embodiment, however, the present invention is not limited to the described embodiment. For example, the clamp circuit shown in the above embodiment comprises the comparator CMP and the MOSFET Q1. However, a clamp circuit using diode may alternatively be applied. Further, the clamp circuit 29 is controlled by the switching control signal CNT of the PWM and the PFM in the above embodiment. However, the clamp circuit 29 may be controlled by another control signal other than the CNT. In that case, the period during which the clamp circuit functions effectively may be limited to a predetermined period when the PFM control is switched to the PWM control.

Further, in the above embodiment, the waveform generation circuit 24 to generate the waveform signal which is to be supplied to the PWM comparator 22 was shown to generate the waveform signal RAMP having the saw-like form, in which the peak point thereof changes according to the output Verror of the error amplifier 21. However, the waveform generation circuit 24 may alternatively be a circuit to generate a saw-like waveform or a triangular waveform having a constant peak value (in which the amplitude is constant). Further, an on-chip element formed on the semiconductor chip, which is the same as the control circuit is used as the switching elements SW1, SW2. However, an external element may alternatively be used.

Further, in the above embodiment, the DC-DC converter of a synchronized rectification type in which the driving transistor SW1 and the rectification transistor SW2 are connected in series so that SW1 is complementarily turned on and off. However, a DC-DC converter of a diode rectification type in which diode is used instead of the rectification transistor SW2 may be applied.

In the above description, the example in which the present invention is applied to the DC-DC converter of a step-down type is explained However, the present invention is not limited to the above description, and may also be applied to a DC-DC converter of a boosting type, or a DC-DC converter of an inverting type to generate a negative voltage.

According to a first aspect of the preferred embodiment of the present invention, there is provided a DC-DC converter comprising:

a drive switching element so that a current flows to an inductor (a coil), the drive switching element being driven by a PWM control pulse or a PFM control pulse, wherein a direct-current input voltage supplied from a direct-current power source is converted so as to output the converted direct-current voltage having a different potential, and wherein a PWM control is performed when a load is larger than a predetermined value and a PFM control is performed when the load is smaller than the predetermined value, the DC-DC converter further comprising:

a pulse width regulation section to regulate the PWM control pulse so as not to have a pulse width smaller than a predetermined pulse width, at least when the PFM control is switched to the PWM control.

According to a second aspect of the preferred embodiment of the present invention, there is provided a DC-DC converter comprising:

an inductor to convert a voltage;

a drive switching element to apply a direct-current input voltage supplied from a direct-current power source to the inductor, so that a current flows and so as to accumulate energy in the inductor;

a rectification element to rectify the current in the inductor during an energy discharging period in which the drive switching element is turned off; and a switching control circuit comprising:

an error amplifier to output a voltage according to an output voltage, and a PWM comparator and a PFM comparator to compare the output of the error amplifier with a predetermined reference voltage, so as to control a time during which the drive switching element is turned on based on an output of the PWM comparator and of the PFM comparator, wherein a PWM control is performed based on the output of the PWM comparator when a load is larger than a predetermined value and a PFM control is performed based on the output of the PFM comparator when the load is smaller than the predetermined value, and wherein the switching control circuit comprises a clamp circuit to clamp the output of the error amplifier at least when the PFM control is switched to the PWM control According to the DC-DC converter comprising the above described configuration, the output voltage can be prevented from being greatly decreased so that the fluctuation of the output voltage can be avoided from being large, the decrease being due to the narrowing of the PWM control pulse at the occasion of switching from the PFM control to the PWM control.

Preferably, the DC-DC converter further comprises a switching circuit to selectively transmit one of the output of the PWM comparator or the output of the PFM comparator, wherein an operation of the clamp circuit is controlled by a control signal to switch the switching circuit.

Thereby, the DC-DC converter need not be comprised with a circuit to generate the control signal to control the operation or the clamp circuit; or an external terminal to input such control signal from outside.

Preferably, the clamp circuit comprises:

a transistor which is connected to a position between an output terminal of the error amplifier and a power source voltage terminal; and a differential amplifier circuit to input the output voltage of the error amplifier and the predetermined reference voltage, wherein the transistor is controlled by an output of the differential amplifier circuit so that the output of the error amplifier is clamped to a predetermined potential.

Preferably, the differential amplifier circuit is configured so that an operation current is interrupted by the control signal.

Thereby, the operation of the clamp circuit can easily be stopped by interrupting the operation current of the differential amplifier circuit. Further, the electric power consumption can be reduced by stopping the operation of the clamp circuit.

According to the embodiment of the present invention, the output voltage can be avoided from being greatly decreased at the occasion of the switching from the PFM control to the PWM control, in the DC-DC converter comprising the PWM control mode aid the PFM control mode so as to generate the drive pulse by the PFM control mode when the load is light.

The entire disclosure of Japanese Patent Application No. 2008-161352 filed on Jun. 20, 2008 including description, claims, drawings, and abstract are incorporated herein by reference in its entirety.

Although an exemplary embodiment has been shown and described, the invention is not limited to the embodiment shown. Therefore, the scope of the invention is intended to be limited solely by the scope of the claims that follow.

What is claimed is:

1. A DC-DC converter comprising:

an inductor to convert a voltage;

a drive switching element to apply a direct-current input voltage supplied from a direct-current power source to the inductor, so that a current flows and so as to accumulate energy in the inductor;

a rectification element to rectify the current in the inductor during an energy discharging period in which the drive switching element is turned off; and a switching control circuit comprising:

an error amplifier to output a voltage according to an output voltage, and a PWM comparator to compare an output of the error amplifier with a waveform signal having a predetermined frequency, and a PFM comparator to compare the output of the error amplifier with a predetermined reference voltage, so that the switching control circuit generates a signal to control turning on and off of the drive switching element, based on an output of the PWM comparator and an output of the PFM comparator, wherein a PWM control is performed based on the output of the PWM comparator when a load is larger than a predetermined value and a PFM control is performed based on the output of the PFM comparator when the load is smaller than the predetermined value, wherein the switching control circuit comprises a clamp circuit to clamp the output of the error amplifier so as not to be lower than a predetermined voltage when the PFM control is performed, and wherein by clamping the output of the error amplifier by the clamp circuit when the PFM control is performed, a PWM pulse output in the PWM control from the PWM comparator, which compares the output of the error amplifier with the waveform signal, is regulated so as not to be smaller than a predetermined pulse width.

2. The DC-DC converter according to claim 1, further comprising a switching circuit to selectively transmit one of the output of the PWM comparator and the output of the PFM comparator, wherein an operation of the clamp circuit is controlled by a control signal to switch the switching circuit.

3. The DC-DC converter according to claim 2, wherein the clamp circuit comprises:
   a transistor which is connected to a position between an output terminal of the error amplifier and a power source voltage terminal; and
   a differential amplifier circuit to input the output of the error amplifier and the predetermined voltage,
   wherein the transistor is controlled by an output of the differential amplifier circuit so that the output of the error amplifier is clamped to a predetermined potential.

4. The DC-DC converter according to claim 3, wherein the differential amplifier circuit is configured so that an operation current is interrupted by the control signal.

* * * * *